United States Patent

[11] 3,579,082

| [72] | Inventors | Hans Jurg Bossi<br>Nussbaumen;<br>Werner Faust, Wettingen, Switzerland |
|---|---|---|
| [21] | Appl. No. | 797,994 |
| [22] | Filed | Feb. 10, 1969 |
| [45] | Patented | May 18, 1971 |
| [73] | Assignee | Aktiengesellschaft Brown, Boveri & Cie<br>Baden, Switzerland |
| [32] | Priority | Feb. 12, 1968 |
| [33] | | Switzerland |
| [31] | | 2,053 |

[54] ARRANGEMENT FOR DIVIDING AND LIMITING THE VOLTAGE FOR A CONVERTER HAVING A PLURALITY OF THYRISTOR VALVES CONNECTED IN SERIES
6 Claims, 5 Drawing Figs.

[52] U.S. Cl. .................................................. 321/11, 307/252
[51] Int. Cl. ............................................... H02m 7/24
[50] Field of Search .......................................... 321/11, 27 (CR); 307/252 (D); 317/33 (SCR), 50, 61.5, 234 (11)

[56] References Cited
UNITED STATES PATENTS
| 3,069,613 | 12/1962 | Enns et al. ..................... | 321/11 |
| 3,135,876 | 6/1964 | Embree et al. ................. | 321/11(UX) |
| 3,386,027 | 5/1968 | Kilgore et al. ................. | 321/11 |
| 3,405,344 | 10/1968 | Boksjo et al. ................. | 321/11 |
| 3,423,664 | 1/1969 | Dewey ............................ | 321/11 |

OTHER REFERENCES
ELECTRONICS, " Semiconductor Modulators for Modern Magnetrons", pp. 42— 45, Sept. 14, 1962, Copy in class 307–252(D)
THE BROWN BOVERIE REVIEW, Vol 55, No. 7, p. 345, July 1968, Copy in class 321–11
GE SILICON CONTROLLED RECTIFIER MANUAL, " V-I Characteristics", pp. 4,5 of 2nd ED, December 1961

Primary Examiner—William H. Beha, Jr.
Attorney—Pierce, Scheffler & Parker

ABSTRACT: An electrical converter arrangement comprises a chain of converter valves of the controllable semiconductor type such as thyristors connected in series. Condensers are connected in parallel with the semiconductor valves and the capacitance values of the condensers vary progressively downward in the direction towards the lowest potential point on the chain. Avalanche diodes arranged oppositely in series are also connected in parallel with the semiconductor valves, and resistances can be connected respectively in series with the condensers.

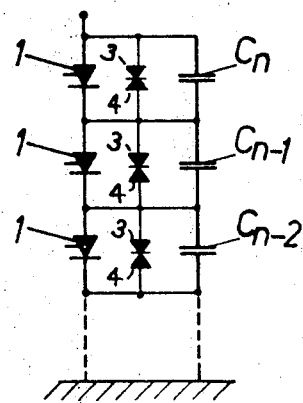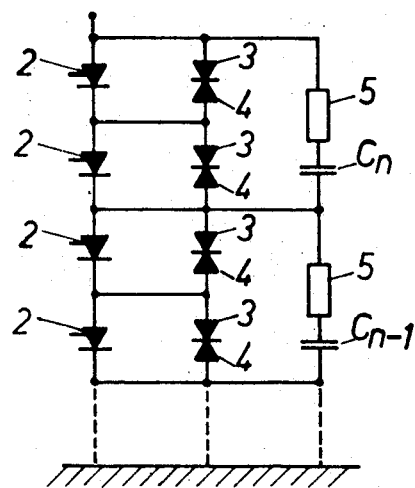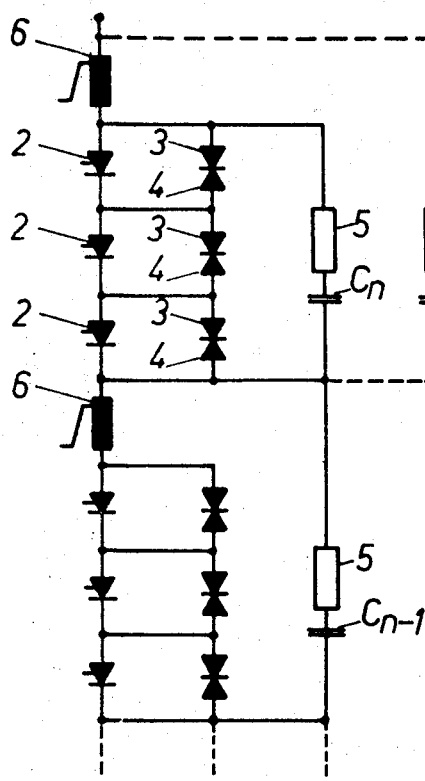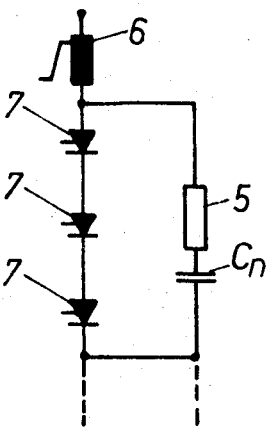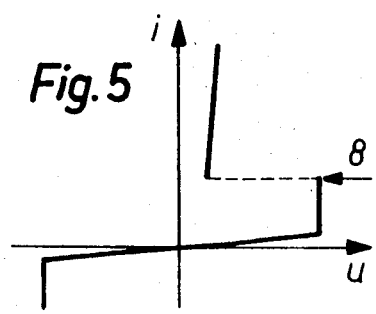

ARRANGEMENT FOR DIVIDING AND LIMITING THE VOLTAGE FOR A CONVERTER HAVING A PLURALITY OF THYRISTOR VALVES CONNECTED IN SERIES

The present invention relates to a converter or rectifier arrangement with several series-connected converter valves, with condensers connected in parallel to at least some of them. In the series connection of converter valves for high-voltage plants it is known, in order to obtain uniform voltage division, to connect one condenser each with a high capacity value parallel to the converter valves, whereby, on the one hand, the values are equal among each other and, on the other hand, the value must be selected unproportionally high in order to eliminate practically the stray capacity of the various valves against ground. With such an arrangement it is disadvantageous, however, that the expenditure for condensers with a high capacity value is relatively great.

According to the invention, a favorable voltage division can be achieved, and the wiring costs of series connections and converter valves can be reduced, if the condensers have the highest value at least at one end of the chain of converter valves, the values decreasing in the direction of the point of the lowest potential, and if the electric valves are designed as controllable semiconductor valves to which avalanche diodes, arranged oppositely in series, are connected in parallel.

The accompanying drawing illustrates several embodiments on the basis of which the invention will be described more fully.

FIG. 1 shows a valve chain where a condenser is connected in parallel with each valve;

FIG. 2 shows an embodiment wherein a condenser with resistance is connected in parallel to two valves each;

FIG. 3 shows another variant with chokes in the chain connected ahead and in between;

FIG. 4 illustrates a thyristor chain; and

FIG. 5 shows the characteristic of the thyristors used in FIG. 4.

With reference now to FIG. 1 a chain of controllable electric valves 1 is shown and wherein each valve 1 has a condenser $C_n$, $C_{n11}$, $C_{n12}$...connected in parallel with it. In the selected example, the bottom end of the valve chain is grounded and the values of the condenser are so selected that the condenser which is parallel to the valve 1 at the upper end has the highest value, the values decreasing in the direction of the point of lowest potential. Complete elimination of the influence of the earth or ground capacities of the valves in view of a uniform voltage division within the chain is achieved in another embodiment in that the condensers are so staggered that their values increase in accordance with the equation $C_n = \frac{1}{2} A \cdot C_0 \cdot n(n-1)$, seen from the point of the lowest potential of the chain valve. $C_n$ is here the capacity value of the condenser associated with the $n$th valve and valve group respectively. $C_0$ denotes an initial value which corresponds for example in a valve chain where the stray capacities of the individual valves are equal among each other, to the ground capacity of the valve or valve group. Avalanche diodes 3, 4 arranged oppositely in series are connected in parallel with each of the semiconductor valves 1.

In some cases, for example, when using thyristors with light control, the point of lowest potential can be within the valve chain. For these cases it is advisable to effect the staggered condenser wiring of the valves in the indicated manner, decreasing from both ends of the chain and increasing respectively from about the center to both ends.

In the example according to FIG. 2, a series connection of a condenser $C_n$–$C_{n11}$ and damping resistance 5 is connected in parallel to each set of two series connected thyristor valves 2. Since the avalanche diodes 3, 4 connected in parallel with each valve 2, in the same manner as in the FIG. 1 embodiment, absorb briefly great power loss surges in blocking direction, it may be advisable, in view of the cooling, to use as controllable valves 2 those which show an avalanche behavior in the blocking direction, and to design only diode 4 having a passing direction opposite to that of valve 2 as an avalanche diode.

According to the embodiment of FIG. 3 which connects the avalanche diodes 3, 4 in parallel with each valve 2 and utilizes damping resistances 5 in series with the condensers $C_n$, a nonlinear choke 6 can be arranged at the end of the valve chain to reduce the $du/dt$ stress and to improve the circuit-closing and breaking behavior of the thyristors 2. But it is also possible to arrange several nonlinear chokes 6 in the valve chain. At the end of the chain, a condenser $C_n{}'$ with resistance $5'$ can be arranged additionally parallel to choke 6 and to at least one valve 2 (there are three in FIG. 3).

If the electric valves, as indicated in FIG. 4, are designed as thyristors 7 with avalanche behavior in both the current conducting and blocking direction, wiring with avalanche diodes is not necessary. Fig. 5 shows the $i/u$ characteristic of such a thyristor where a sweep current of sufficient size, for example, 0.2 to 1 ampere appears at point 8.

We claim:

1. In an electrical converter arrangement the combination comprising a chain of converter valves of the controllable semiconductor type connected in series, pairs of avalanche diodes arranged oppositely in series and connected respectively in parallel with each of said semiconductor valves, and capacitively graded condensers also connected in parallel with said semiconductor valves, the condenser having the highest capacitance value being located at that end of the semiconductor valve chain having the higher potential and the respective capacitance values of the remaining parallel connected condensers being progressively decreased in the direction of the other end of the chain having the lowest potential.

2. An electrical converter arrangement as defined in claim 1 and which further includes a nonlinear choke connected into at least one end of said semiconductor valve chain.

3. An electrical converter arrangement as defined in claim 1 and which further includes a nonlinear choke connected into at least one end of said semiconductor valve chain, and a condenser connected in parallel to said choke and to at least one of said semiconductor valves.

4. An electrical converter arrangement as defined in claim 3 and which further includes a resistance connected in advance of the condenser.

5. An electrical converter arrangement as defined in claim 1 wherein said condensers exhibit increasing capacitance values according to the equation $C_n = \frac{1}{2} C_0 \cdot qn(n-1)$ as seen from the point of lowest potential on said chain, wherein $C_0$ denotes an initial value and $C_n$ the capacitance value of the condenser associated with the $n$th valve and valve group respectively.

6. In an electrical converter arrangement the combination comprising a chain of converter valves of the controllable semiconductor type connected in series, said semiconductor converter valves exhibiting avalanche behavior only in the current blocking direction, pairs of diodes arranged oppositely in series and connected respectively in parallel with each of said semiconductor valves, the diode of each pair having a conducting direction opposite to that of the converter valve with which it is parallel connected being of the avalanche type, and capacitively graded condensers also connected in parallel with said semiconductor valves, the condenser having the highest capacitance value being located at that end of the valve chain having the higher potential and the respective capacitance values of the remaining parallel connected condensers being progressively decreased in the direction of the other end of the chain having the lowest potential.

PO-1050
(5/69)

UNITED STATES PATENT OFFICE
CERTIFICATE OF CORRECTION

Patent No. 3,579,082  Dated May 18, 1971

Inventor(s) HANS JURG BOSSI and WERNER FAUST

It is certified that error appears in the above-identified patent and that said Letters Patent are hereby corrected as shown below:

In the specification, column 1, line 50, the following equation appears:

$$"C_n = 1/2A.C_o n(n-1)"$$

which should read:

$$"C_n = 1/2 \cdot C_o \cdot n(n-1)"$$

Claim 5, line 3 reads as follows:

"according to the equation $C_n = 1/2 \cdot C_o \cdot qn(n-1)$"

which should read:

"according to the equation $C_n = 1/2 \cdot C_o \cdot n(n-1)$"

Signed and sealed this 12th day of October 1971.

(SEAL)
Attest:

EDWARD M. FLETCHER, JR.
Attesting Officer

ROBERT GOTTSCHALK
Acting Commissioner of Patents